(12) United States Patent
Takagi et al.

(10) Patent No.: US 10,809,440 B2
(45) Date of Patent: Oct. 20, 2020

(54) LIGHT GUIDE PLATE, DISPLAY DEVICE AND GAME MACHINE

(71) Applicant: OMRON Corporation, Kyoto (JP)

(72) Inventors: Yoshihiko Takagi, Kyoto (JP); Takaaki Suzumura, Shiga (JP)

(73) Assignee: Omron Corporation, Kyoto (JP)

( * ) Notice: Subject to any disclaimer, the term of this patent is extended or adjusted under 35 U.S.C. 154(b) by 348 days.

(21) Appl. No.: 15/808,752

(22) Filed: Nov. 9, 2017

(65) Prior Publication Data

US 2018/0164492 A1 Jun. 14, 2018

(30) Foreign Application Priority Data

Dec. 8, 2016 (JP) ................................ 2016-238834

(51) Int. Cl.
*G02B 6/00* (2006.01)
*G09F 13/18* (2006.01)
(Continued)

(52) U.S. Cl.
CPC ........... *G02B 6/0036* (2013.01); *G02B 6/006* (2013.01); *G02B 6/009* (2013.01); *G02B 6/0016* (2013.01); *G02B 6/0018* (2013.01); *G02B 6/0031* (2013.01); *G02B 6/0068* (2013.01); *G02B 6/0088* (2013.01); *H04N 13/30* (2018.05);
(Continued)

(58) Field of Classification Search
CPC ................................. G09F 13/18; G02B 6/006
See application file for complete search history.

(56) References Cited

U.S. PATENT DOCUMENTS

| 7,121,709 | B2 * | 10/2006 | Shinohara | ............ | G02B 6/0036 |
| | | | | | 362/606 |
| 7,445,361 | B1 * | 11/2008 | Hsu | ........................ | G02B 5/045 |
| | | | | | 362/223 |

(Continued)

FOREIGN PATENT DOCUMENTS

| JP | S48-010920 B1 | 4/1973 |
| JP | 2006-75362 A | 3/2006 |

(Continued)

OTHER PUBLICATIONS

Office Action in counterpart Japanese Patent Application No. 2016-238834 dated Nov. 12, 2019 (10 pages).

*Primary Examiner* — Steven J Hylinski
(74) *Attorney, Agent, or Firm* — Osha Liang LLP

(57) ABSTRACT

A light guide plate formed from a panel transparent to visible light has a first incidence surface provided to form a sidewall of the light guide plate that faces a light source configured to emit visible light, and a plurality of prisms provided in a predetermined region on one surface of the light guide plate. The prisms include a reflection surface that reflects the visible light emitted from the light source and entering the light guide plate from the first incidence surface toward another surface of the light guide plate. The predetermined region is divided into a plurality of local regions corresponding to a plurality of tones in the predetermined region when seen from a predetermined viewpoint, and in each local region, the orientation of the reflection surface of the prisms distributed in the local region is established in accordance with the tone corresponding to that local region.

14 Claims, 10 Drawing Sheets

US 10,809,440 B2
Page 2

(51) Int. Cl.
  *F21V 8/00* (2006.01)
  *H04N 13/30* (2018.01)
  *G09G 3/34* (2006.01)
  *A63F 13/25* (2014.01)
  *A63F 7/02* (2006.01)

(52) U.S. Cl.
  CPC .............. *A63F 7/022* (2013.01); *A63F 7/027* (2013.01); *A63F 13/25* (2014.09); *G09G 3/3406* (2013.01)

(56) References Cited

U.S. PATENT DOCUMENTS

| | | | | |
|---|---|---|---|---|
| 7,446,828 B2 * | 11/2008 | Tamura | .................. | G02B 6/002 257/E33.059 |
| 7,455,443 B2 * | 11/2008 | Sakurai | ................ | G02B 6/0038 362/623 |
| 7,458,713 B2 * | 12/2008 | Onishi | ................. | G02B 6/0038 362/606 |
| 7,507,011 B2 * | 3/2009 | Ueno | .................... | G02B 6/0028 362/612 |
| 7,518,593 B2 * | 4/2009 | Daiku | .................... | B60K 35/00 345/102 |
| 7,528,901 B2 * | 5/2009 | Hashimoto | .......... | G02B 6/0053 349/112 |
| 7,614,777 B2 * | 11/2009 | Koganezawa | ....... | G02B 6/0068 362/613 |
| 7,637,645 B2 * | 12/2009 | Hsu | ........................ | G02B 5/124 359/599 |
| 7,641,374 B2 * | 1/2010 | Chen | .................... | G02B 6/0036 362/606 |
| 7,719,632 B2 * | 5/2010 | Koganezawa | ....... | G02B 6/0046 349/65 |
| 7,771,100 B2 * | 8/2010 | Yamamoto | ........... | G02B 6/0033 362/606 |
| 7,794,129 B2 * | 9/2010 | Tien | ...................... | G02B 5/0215 362/606 |
| 8,096,692 B2 * | 1/2012 | Yoneda | ................ | G02B 6/0036 362/23.16 |
| 8,096,693 B2 * | 1/2012 | Taya | .................... | G02B 6/0038 362/330 |
| 8,182,131 B2 * | 5/2012 | Shim | .................... | G02B 6/0038 362/600 |
| RE44,063 E * | 3/2013 | Uehara | ................ | G02B 6/0053 349/65 |
| D679,444 S * | 4/2013 | Vasylyev | .................... | D26/120 |
| 9,417,378 B2 * | 8/2016 | Takagi | .................. | G02B 6/006 |
| 9,921,360 B2 * | 3/2018 | Hirayama | ........... | G02B 6/0061 |
| 10,139,549 B2 * | 11/2018 | Takagi | .................. | G02B 6/006 |
| 10,274,663 B2 * | 4/2019 | Chang | .................... | H05K 1/181 |
| 2001/0019479 A1 * | 9/2001 | Nakabayashi | ....... | G02B 6/0018 362/615 |
| 2001/0049893 A1 * | 12/2001 | Maas | ...................... | G09F 19/12 40/544 |
| 2002/0048165 A1 * | 4/2002 | Taniguchi | ............ | G02B 6/0061 362/601 |
| 2002/0163790 A1 * | 11/2002 | Yamashita | ............. | G02B 5/045 362/612 |
| 2003/0030764 A1 * | 2/2003 | Lee | ...................... | G02B 6/0065 349/65 |
| 2004/0218390 A1 * | 11/2004 | Holman | ............... | G02B 17/002 362/245 |
| 2006/0221642 A1 * | 10/2006 | Daiku | .................... | B60K 35/00 362/626 |
| 2008/0316744 A1 * | 12/2008 | Hirota | .................. | G02B 6/0061 362/247 |
| 2012/0188792 A1 * | 7/2012 | Matsumoto | .......... | G02B 6/0036 362/613 |
| 2012/0275190 A1 * | 11/2012 | Matsumoto | .......... | G02B 6/0036 362/609 |
| 2013/0170250 A1 * | 7/2013 | Kikuchi | ............... | G02B 6/0038 362/609 |
| 2015/0092444 A1 | 4/2015 | Takagi et al. | | |
| 2015/0168627 A1 | 6/2015 | Takagi et al. | | |
| 2017/0038515 A1 * | 2/2017 | Yuki | .................... | G02B 6/0061 |
| 2017/0285245 A1 * | 10/2017 | Fujita | .................... | A63F 7/027 |
| 2020/0041714 A1 * | 2/2020 | Takagi | .................. | G02B 6/0036 |

FOREIGN PATENT DOCUMENTS

| | | |
|---|---|---|
| JP | 2011-232717 A | 11/2011 |
| JP | 2015-088489 A | 5/2015 |
| JP | 2015-118128 A | 6/2015 |

* cited by examiner

LIGHT GUIDE PLATE, DISPLAY DEVICE AND GAME MACHINE

FIELD

The present invention relates to a light guide plate that presents and illuminated design, a display device, and a game machine that includes such a display device.

RELATED ART

Devices have been proposed which use a panel-like light guide plate made of optically transmissive material to present an illuminated pattern. Much has been devoted to devise various ways for improving an observer's sense of realism with this kind of technology (see, for instance, Japanese Unexamined Patent Publication No. 2015-88489 and Japanese Unexamined Patent Publication No. 2011-232717).

For instance, the light guide body disclosed in JP 2015-88489 A establishes a plurality of reflective patterns in a reflection area, where a reflection area corresponds to a light emitting area on a surface facing a light emission surface. Each of the reflection patterns are distributed so that the reflection patterns continuously vary the amount of light in accordance with the position in the radiation area; more specifically, the reflection patterns vary the amount of light reflected by the reflection pattern and emitted from the radiation area that reaches an observer viewing the light emission surface.

The display device disclosed in JP 2011-232717 A is also provided with a plurality of reflection portions in the form of dots on a reflection surface, which is one surface of the light guide plate; the reflection surface reflects light incident thereon toward the other surface in the light guide plate. The reflection surface is made up of two sub-reflection surfaces created by bending a flat sloped surface relative to a boundary line. The light reflected from the plurality of dot-shaped reflection portions present a specific pattern.

SUMMARY

The technology disclosed in Patent Document 1 allows an observer to perceive the radiation area in three dimensions. The technology disclosed in Patent Document 2 further increases the range from which an observer may perceive the pattern. However, in order to improve the sense of realism for an observer, the illuminated section for viewing must be presented in a way that does not reveal these techniques.

Therefore, one or more embodiments of the present invention provides a light guide plate that improves the sense of realism for an observer.

One or more embodiments of the present invention provides a light guide plate formed from a panel transparent to visible light. The light guide plate includes: a first incidence surface provided to form the sidewall of the light guide plate that faces a light source, the light source configured to emit visible light; and a plurality of prisms provided in a predetermined region on one surface of the light guide plate, the plurality of prisms including a reflection surface that reflects the visible light emitted from the light source and entering the light guide plate from the first incidence surface toward another surface of the light guide plate. The predetermined region is divided into a plurality of local regions corresponding to a plurality of tones in the predetermined region when viewed from a predetermined viewpoint; in each local region, the orientation of the reflection surface of the prisms distributed in the local region is established in accordance with the tone corresponding to that local region.

In the light guide plate the light from the light source may collimate in a plane including the length direction of the first incidence surface and enter the light guide plate, and for each local region the prisms and the reflection surfaces distributed in a local region may be configured such that the prisms and the angle of the reflection surface along the one surface relative to a reference orientation are oriented in accordance with the tone corresponding to the local region, where the reference orientation is taken as an orientation directly facing the light source.

The prisms may include a first reflection surface and a second reflection surface rotated in mutually reverse orientations along the one surface, and for each local region the prisms and the first and second reflection surfaces distributed in a local region may be configured such that the prisms and the angle of the first and second reflection surfaces respectively along the one surface relative to the reference orientation are oriented in accordance with the tone corresponding to the local region.

Alternatively, in the light guide plate the light from the light source may collimate in a plane including the width direction of the first incidence surface and enter the light guide plate, and for each of the local regions, the prisms distributed in a local region may be configured such that the inclination of the reflection surface of the prisms relative to the one surface are oriented in accordance with the tone corresponding to said local region.

The number of tones in a portion of the predetermined region in the light guide plate may be configured to be greater than the number of tones in other regions in the predetermined region.

Alternatively, each local region in the plurality of local regions in the light guide plate may be established so that two mutually adjacent local regions in at least one portion of the predetermined region differ by one step.

In the light guide plate the light from the light source may collimate in a plane including the length direction of the first incidence surface and enter the light guide plate, and for each local region the prisms and the reflection surfaces distributed in a local region may be configured such that the prisms and the angle of the reflection surface along the one surface relative to a reference orientation are oriented in accordance with the tone corresponding to the local region, where the reference orientation is taken as an orientation directly facing the light source; the light guide may include a second incidence surface forming another side surface orthogonal to the side surface forming the first incidence surface. The predetermined region may further include a second local region, the second local region further including a plurality of second prisms including a reflection surface that reflects the visible light emitted from a second light source and entering the light guide plate from the second incidence surface toward another surface of the light guide plate.

One or more embodiments of the present invention provides a display device. The display device includes a light source configured to emit visible light, a light guide plate formed from a panel transparent to visible light; and a controller configured to control the turning on and off of the light source. The light guide plate includes: an incidence surface provided to form the sidewall of the light guide plate that faces the light source; and a plurality of prisms provided in a predetermined region on one surface of the light guide plate, the plurality of prisms including a reflection surface that reflects the visible light emitted from the light source and entering the light guide plate from the incidence surface toward another surface of the light guide plate. The predetermined region is divided into a plurality of local regions corresponding to a plurality of tones in the predetermined region when viewed from a predetermined viewpoint; in each local region, the orientation of the reflection surface of the prisms distributed in the local region is established in accordance with the tone corresponding to that local region.

The light source in the display device may include a plurality of light emitting elements arranged along the length direction of the incidence surface; and the controller may vary the light emitting elements among the plurality of light emitting elements that turn on over time.

One or more embodiments of the present invention provides a game machine. The game machine includes: a main game unit; a display device provided on the surface of the main game unit facing a player. The display device includes: a light source configured to emit visible light; a light guide plate formed from a panel transparent to visible light; and a controller configured to control the turning on and off of the light source.

The light guide plate includes: an incidence surface provided to form the sidewall of the light guide plate that faces the light source; and a plurality of prisms provided in a predetermined region on one surface of the light guide plate, the plurality of prisms including a reflection surface that reflects the visible light emitted from the light source and entering the light guide plate from the incidence surface toward another surface of the light guide plate. The predetermined region is divided into a plurality of local regions corresponding to a plurality of tones in the predetermined region when viewed from a predetermined viewpoint; in each local region, the orientation of the reflection surface of the prisms distributed in the local region is established in accordance with the tone corresponding to that local region.

A light guide plate according to one or more embodiments of the present invention improves the sense of realism for an observer.

DETAILED DESCRIPTION

Embodiments of the present invention are described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. According to one or more embodiments of the present invention, a display device includes a light guide plate formed from a panel that is transparent in visible light; one surface of the light guide plate faces the observer and is taken as the emission surface. A plurality of prisms is created on the surface of the light guide plate facing the emission surface (i.e., on the diffusion surface) in a light emitting region that presents an illuminated pattern to an observer; light enters the light guide plate from an incidence surface formed on a sidewall thereof. The plurality of prisms reflects the visible light emitted from the light source and entering the light guide plate from the incidence surface toward the emission surface. The light emitting region is partitioned into a plurality of local regions each corresponding to a plurality of tones when viewed from a predetermined viewpoint. For each local region the orientation of the reflection surface of the prisms distributed throughout the local region is established in accordance with the tone corresponding to that local region. The light emitting region can thus reproduce presenting an observer with a simulation of light reflecting from an uneven metallic surface, i.e., invoke a metallic feel, whereby the display device improves the user's sense of realism.

Figure 1:
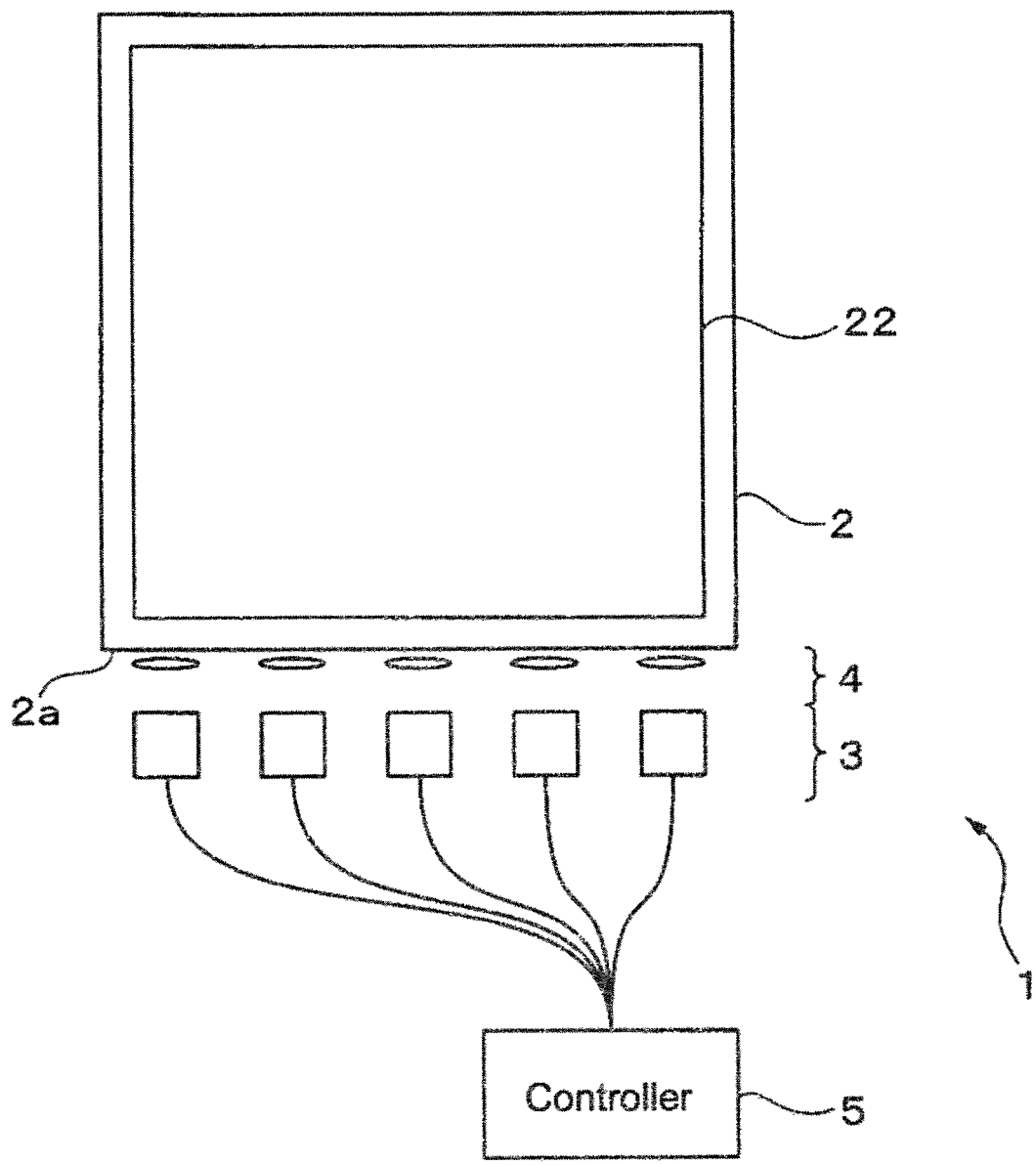
FIG. 1 schematically illustrates a configuration of a display device according to one or more embodiments of the present invention.

FIG. 1 schematically illustrates a configuration of a display device according to one or more embodiments of the present invention. The display device 1 includes a light guide plate 2, a light source 3, a collimator 4, and a controller 5.

The light guide plate 2 is produced from a flat panel like material that is transparent with respect to the visible light emitted from the light source 3. For instance, the light guide plate 2 may be molded from a visible-light-transparent resin of poly methyl methacrylate (PMMA), a polycarbonate, or a cycloolefin polymer. A plurality of prisms is created in a light emitting region 22 on the diffusion surface, i.e., on the rear surface, which does not face an observer. When the light source 3 is lit, the light guide plate 2 allows the observer to perceive the illuminated pattern with a metallic texture due to the light from the light source 3 propagating through the light guide plate 2 and being reflected by the plurality of prisms toward an observer located in front of the light guide plate 2.

The specifics of the light guide plate 2 are described later.

Light source 3 includes at least one light emitting element that emits visible light. For example, the light source 3 may include a plurality of light emitting elements distributed along the length direction of the incidence surface 2a. The light emission plane of the light emitting elements is arranged facing the incidence surface 2a which is at least one of the side walls in the light guide plate 2. The controller 5 sends a control signal according to which the light emitting elements in the light source 3 turn on or off. When the controller 5 turns on the light source 3, the light emitted from the light emitting elements in the light source 3 enters the light guide plate 2 via the collimator 4 and the incidence surface 2a, travels straight or is totally reflected through the light guide plate 2, is reflected at the plurality of prisms formed on the diffusion surface 2b on the rear surface of the light guide plate 2, and then exits from the emission surface 2c toward the front surface.

The light emitting elements included in the light source 3 may be a light emitting diode, and incandescent light, a fluorescent light, or an organic EL element.

The collimator 4 is arranged between the light source 3 and the incidence surface 2a of the light guide plate 2; the collimator 4 produces parallel light in a specific direction from the light emitted from the light guide light emitting elements in the light source 3. For example, the collimator 4 may include a collimating lens placed between a light emitting element and the light incidence surface 2a for each light emitting element included in the light source 3. The collimating lenses may be a cylindrical lens with, for instance, a positive optical power that creates parallel light from the light emitted from a corresponding light emitting element in a plane including the length direction of the incidence surface 2a; and no optical power in the plane including the width direction of the incidence surface 2a (i.e., the thickness direction of the light guide plate 2). Hereby, the collimator 4 converts the light from the light emitting elements in the light source 3 to parallel light in the plane including the length direction of the incidence surface 2a whereby parallel light enters the light guide plate 2 via the incidence surface 2a. In this case, because the light from the light source hardly spreads at the plane including the length direction of the incidence surface 2a, the change in the amount of light reaching an observer is relatively large in each local region when the observer's viewpoint moves along the length direction of the incidence surface 2a (for the sake of brevity, this is referred to as the horizontal direction below). In contrast, the light from the light source 3 spreads in accordance with the radiation pattern of the light emitting elements and the breadth of the incidence surface 2a in the width direction of the incidence surface 2a (i.e., in the thickness direction of the light guide plate 2) when entering the light guide plate 2; therefore, even if the observer's viewpoint moves parallel to the diffusion surface 2b and along a direction orthogonal to the length direction of the incidence surface 2a (for the sake of brevity, this is referred to as the vertical direction below), the change in the amount of light reaching said viewpoint is relatively small. Therefore, even if an observer's viewpoint moves along the vertical direction, the brightness of the local regions changes relatively little, and as a result the light emitting region 22 appears the same over a wide range in the vertical direction of the display device 1.

Each of the collimating lenses in the collimator 4 may have a positive optical power for creating parallel light from the light emitted from the corresponding light emitting element in a plane including the width direction and the plane in including the length direction of the incidence surface 2a. In this case, the brightness in each of the local regions changes to a large extent with the movement of the viewpoint, not only when the observer's viewpoint moves along the horizontal direction but also when the observer's viewpoint moves along the vertical direction.

Each of the collimating lenses in the collimator 4 may be composed from glass or a transparent resin; the lenses may possess a cylindrical, spherical, or non-spherical surface, and may be a refractive, a GRIN, or a diffractive lens.

The controller 5 may include a processor, a memory circuit, and a drive circuit for the light source 3. The controller 5 may turn the light source 3 on or off in response to a signal from a control device (not shown) in a host control device. Finally, the controller 4 turns on the light source 3 to render the design in the light emitting region 22 visible to an observer in front of the light guide plate 2, and on the other hand, turns off the light source 3 so the observer cannot see the design in the light emitting region 22.

The specifics of the light guide plate 2 are described below.

Figure 2A:
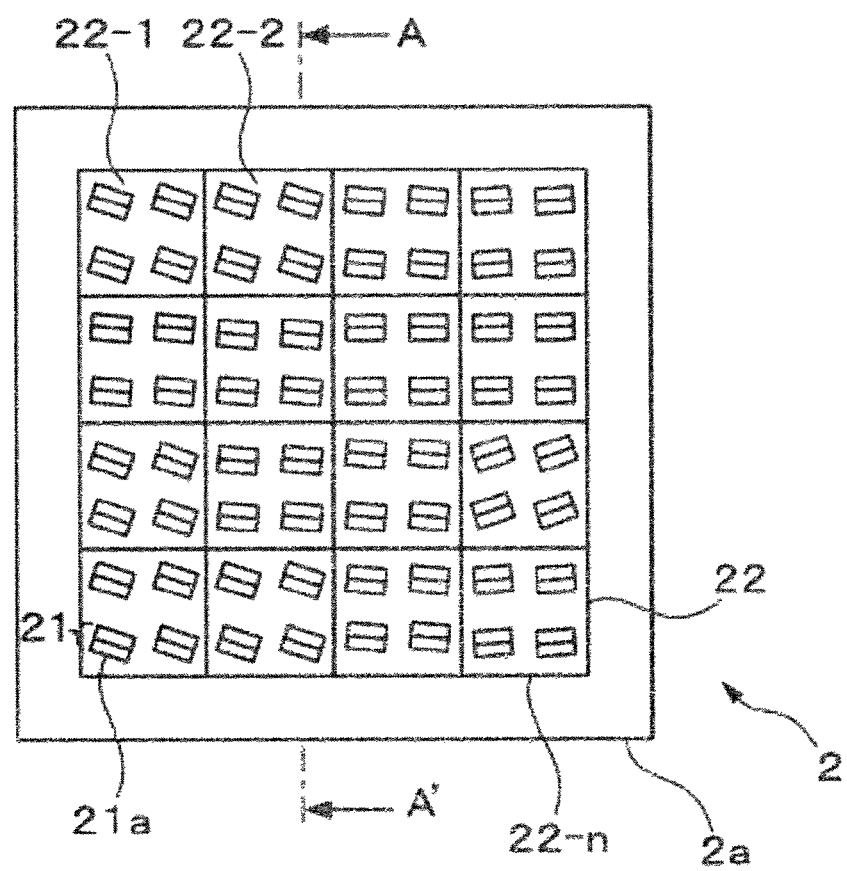
FIG. 2A is a schematic front view of a light guide plate in the display device.
Figure 2B:
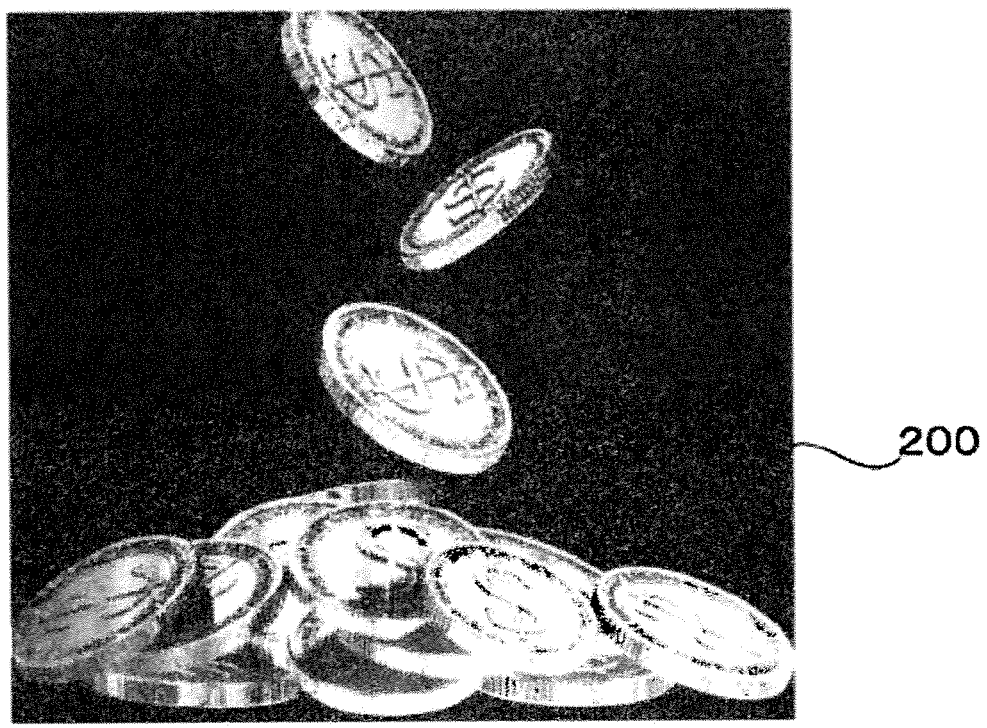
FIG. 2B illustrates an example of a design having a metallic feel presented in the light emitting region.
Figure 3:
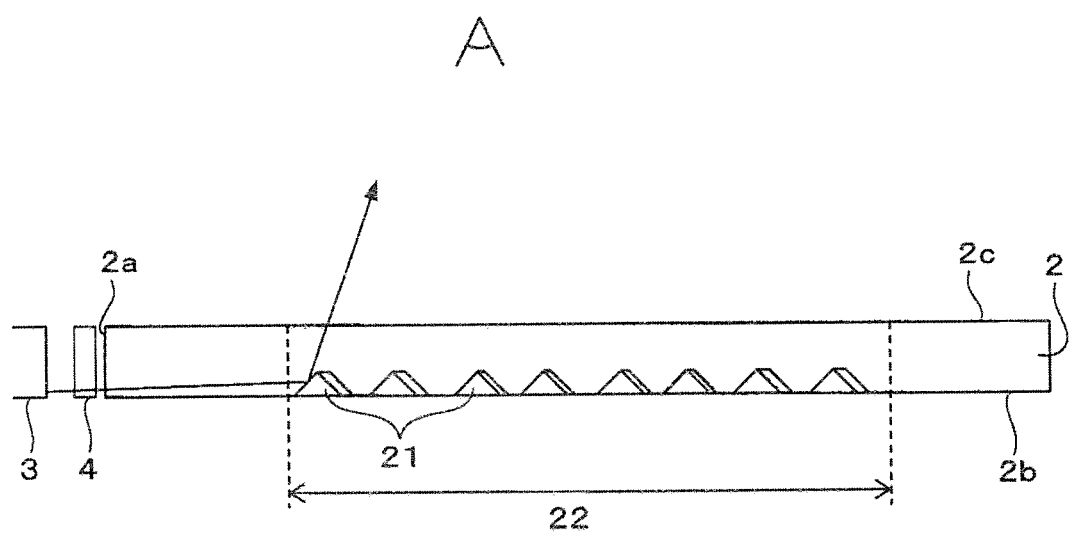
FIG. 3 is a schematic lateral cross-sectional view of the light guide plate along the line A-A' in FIG. 2A.

FIG. 2A is a schematic front view of a light guide plate in the display device; and FIG. 2B illustrates an example of a design having a metallic feel presented in the light emitting region 22. In this example, a plurality of coins having a metallic texture is presented as the design 200. FIG. 3 is a schematic lateral cross-sectional view of the light guide plate along the line A-A' in FIG. 2A. As illustrated in FIG. 2A and FIG. 3, the incidence surface 2a is formed on one sidewall surface of the light guide plate 2 facing the light source 3. Light from the light source 3 enters the light guide plate 2 from the incidence surface 2a via the collimator 4. The light propagates through the light guide plate 2 via either total internal reflection from the diffusion surface 2b and the emission surface 2c, or by traveling linearly therethrough. This light is totally reflected by any of the plurality of prisms 21 formed on the diffusion surface 2b located on the rear surface of the light guide plate 2; the light then exits from the emission surface 2c which is located on the front surface of the light guide plate 2 and facing the diffusion surface 2b. In this embodiment, the plurality of prisms 21 are distributed within the light emitting region 22 which produces a design that invokes a metallic feel. Consequently, while the light source 3 is illuminated, an observer is able to view the design presented by the light emitting region 22 on the surface of the light guide plate 2. Note that while only a single light emitting region 22 is depicted in FIG. 2A, the light guide 22 may be provided with a plurality of light emitting regions 22. When provided with a plurality of light emitting regions 22, the light emitting regions may be arranged to be mutually adjacent, or may be mutually separated to create a checkered pattern. The light emitting regions 22 may be mutually identical. Hereby, for instance, a patterning mask may be prepared corresponding to a light emitting region 22 when producing each of the prisms 21 via photolithography. Using a mask for each of the light emitting regions 22 thereby creates prisms 21 in the light emitting regions 22 on the light guide plate 2. This therefore simplifies the process of manufacturing the light guide plate 2. Alternatively, the shape and size of each of the light emitting regions 22 may be determined as appropriate in accordance with the design for display. The sizes of the prisms 21, and the thickness of the light guide plate 2 are exaggerated in FIG. 2A and FIG. 3 for illustrative purposes.

The light emitting region 22 is one example of a predetermined region. A plurality of levels of brightness may be established in advance in accordance with the design to be displayed. The light emitting region 22 may be divided into local regions 22-1 to 22-n (where n is an integer greater than or equal to 2) where each local region has the same tone when seen from the predetermined viewpoint. Each of the local regions 22-1 to 22-n may be triangles, rectangles, pentagons, circles, or combinations thereof, or the local regions may be more complicated shapes. At least any of the local regions 22-1 to 22-n may be provided a different shape from the other local regions. Moreover, the local regions 22-1 to 22-*n* may be the same size, or at least any one thereof may be a different size from the other local regions.

According to one or more embodiments of the present invention, the size of the local regions 22-1 to 22-*n* is no less than the minimum surface area perceivable by an observer's eyes. For instance, assume that a minimal perceivable visual angle for the observer is equivalent to one arc minute, that is, the visual angle for person with normal visual acuity. Also assume that the observer and the light guide plate 2 are 600 mm apart. According to one or more embodiments of the present invention, the length of one side of the local regions 22-1 to 22-*n* is greater than or equal to 0.17 mm, or the surface area of the local regions 22-1 to 22-*n* is greater than or equal to 0.5 mm$^2$.

At least one prism 21 is placed in each of the local regions 22-1 to 22-*n*. The prisms 21 may be arranged as lattices, lines, or may be staggered for each local region.

Figure 4A:
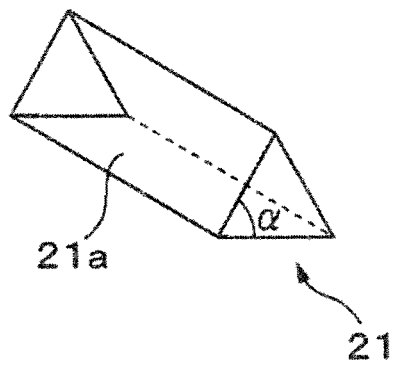
FIG. 4A is a schematic perspective view of a prism.
Figure 4B:
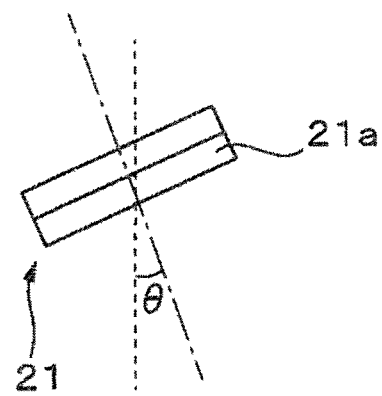
FIG. 4B is a schematic plan view of a prism.

FIG. 4A is a schematic perspective view of a prism 21; and FIG. 4B is a schematic plan view of the prism 21. Each of the plurality of prisms 21 may be created as grooves in the diffusion surface 2*b* that are roughly triangular, with the one surface of the groove toward the light guide light source 3 formed as the reflection surface 21*a*. The reflection surface 21*a* in each of the prisms 21 are a predetermined length along the diffusion surface 2*b* and form a predetermined inclination a with the diffusion surface 2*b*. The predetermined length is long enough so that the observer cannot see the prisms 21; for instance, this predetermined length may be several to tens of micrometers. The predetermined angle may be established so that light from the light source 3 entering the light guide plate 2 is totally internally reflected and travels toward the emission surface 2*c*; for instance, this angle may be 30° to 60° relative to the diffusion surface 2*b*.

As is later described, the inclination a of the reflection surface 21*a* in the prisms 21 is established for each local region.

Moreover, as is later described in detail, the rotation angle θ of a reflection surface 21*a* may also be established for each local region. The rotation angle θ of the reflection surface 21*a* is the rotation about a vertical direction from the diffusion surface 2*b* relative to the reference orientation in a plane parallel to the diffusion surface 2*b* (referred to below as simply the rotation angle). Note that this reference orientation may be when the incidence direction of light from the light source 3 coincides with a normal line direction from the reflection surface 21*a*; that is, this reference orientation can be taken as the orientation of the reflection surface 21*a* when the same directly faces the light source 3.

Each of the local regions may be configured so that prisms 21 with a rotation angle θ and a rotation angle (−θ) are arranged alternating with each other. Thus, light from the light source 3 is reflected from the local region toward two directions symmetrical about a normal line direction from the incidence surface 2*a*. Accordingly, a certain amount of light reaches an observer regardless of whether the observer's viewpoint is on either side in the length direction of the incidence surface 2*a*; therefore, this increases the range of viewpoints from which the overall design in the light emitting region 22 may be observed.

Figure 4C:
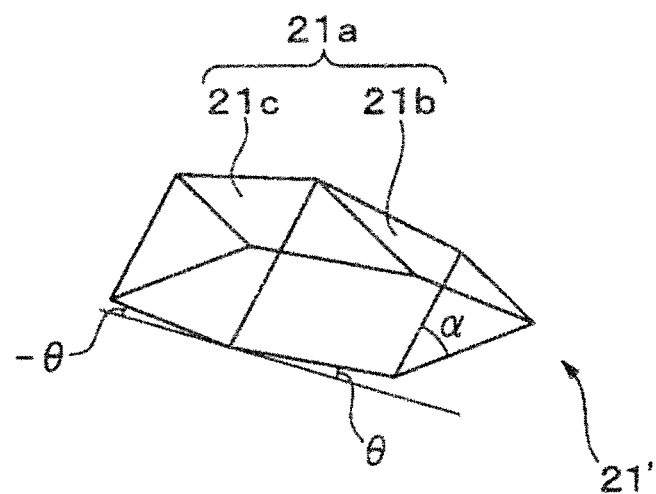
FIG. 4C is a schematic perspective view of a modified version of the prism.

FIG. 4C is a schematic perspective view of a modified version of the prism 21'. In this modification example, the reflection surface 21*a* of the prism 21' is bent at the center lengthwise of the reflection surface 21*a* so that the reflection surface protrudes in relation to the light source 3. That is, the reflection surface 21*a* includes two sub-reflector surfaces 21*b*, 21*c* that have different rotation angles. The rotation angles of the two sub-reflector surfaces 21*b*, 21*c* are set so that the sizes are the same and the rotation directions are mutually reverse orientations. For example, when the rotation angle of the sub-reflector surface 21*b* on the right side when viewed from the light source 3 is θ, the rotation angle of the sub-reflector surface 21*c* on the left side when viewed from the light source 3 is (−θ). Thus, the prism 21' can reflect light from the light source 3 toward two directions symmetrical in relation to a reference orientation. Accordingly, a certain amount of light reaches an observer regardless of whether the observer's viewpoint is along either side in the horizontal direction; therefore, this increases the range of viewpoints from which the overall design in the light emitting region 22 may be observed. The inclination a of the sub-reflector surface 21*b* and the inclination a of the sub-reflector surface 21*c* may be identical.

The reflection surface of the prism 21 may be a conical curved surface with the surface toward the light source 3 being convex. The light from the light source 3 also spreads in the horizontally in this case, and therefore increases the range of viewpoints from which the design from the entire light emitting region 22 may be observed. However, in this case, the rotation angle cannot be used to adjust the brightness in a local region. Therefore, the brightness in each local region is adjusted by way of the inclination of the reflection surface 21*a* of the prism 21.

In order for the light emitting regions 22 to produce a metallic texture for an observer, one or more embodiments of the present invention spatially varies brightness in the light emitting regions 22 from a predetermined viewpoint of the observer, and establishes an orientation for the reflection surface 21*a* (i.e., at least any of the rotation angle and the inclination) in each of the prisms 21 arranged in a local region for each local region. That is, as above described, a light emitting region 22 is divided into a plurality of local regions 22-1 to 22-*n* in accordance with a tone seen from a predetermined viewpoint; the orientation of the reflection surface 21*a* in each of the prisms 21 is established for each local region so that the local region has the same brightness overall. The predetermined viewpoint may be taken as the location of a predetermined distance from the light guide plate 2 in a vertical direction from the center of the light emitting region 22 (e.g., 600 mm). However, the predetermined viewpoint may be established as appropriate in accordance with a conceivable positional relationship between the light emitting region 22 and the observer.

For example, the brightness in the light emitting region 22 may be subdivided into n levels (e.g., 6, 8, 10, or the like). A single local region may be established for each tone. A direction of maximum intensity of light emitted from the emission surface 2*c* (referred to as the designated direction, below) may be established for each local region in accordance with the tone for that local region. The orientation of the reflection surface 21*a* of the prisms 21 in the local region having maximum brightness may be set, for instance, so that the designated direction thereof is toward the predetermined viewpoint. The orientation of the reflection surface 21*a* of the prisms 21 in local region may be set so that the designated direction moves away from predetermined viewpoint as the tone decreases, i.e., the darker the local region.

The light emitting region 22 may contain a region between adjacent local regions where there is a one-step difference in tone between said local regions. Hereby, the tone may change continuously in a space, and therefore makes it possible to express the smoothness of a metallic surface.

Figure 5:
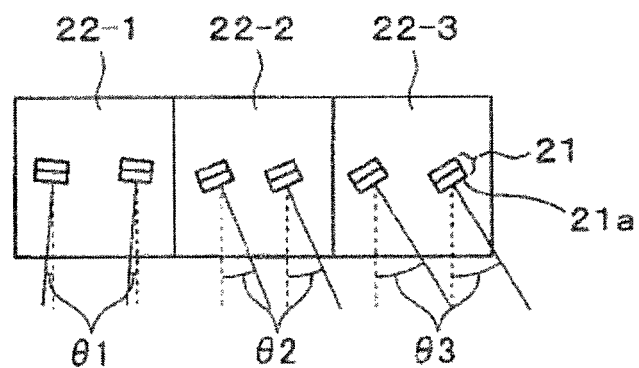
FIG. 5 is a partially exploded plan view of a light emitting region depicting an arrangement of prisms when the brightness in a local region is adjusted via the rotation angle of the reflection surface of the prisms in the local region.

FIG. 5 is a partially exploded plan view of a light emitting region 22 depicting an arrangement of prisms 21 when the brightness in a local region is adjusted via the rotation angle of the reflection surface 21a of the prisms 21 in the local region; FIG. 5 illustrates three local regions 22-1 to 22-3.

In this example, the rotation angle for the reflection surface 21a of the prisms 21 distributed in the local region 22-1, the local regions 22-2, and the local region 22-3 are θ1, θ2, and θ3, respectively. The rotation angles θ1, θ2, and θ3 are mutually distinct. Therefore, because the light from the light source 3 is reflected toward different directions by the local regions 22-1 to 22-3 respectively, the designated direction is also distinct for each local region. As a result, the amount of light reaching a predetermined viewpoint is different for each of the local regions 22-1 to 22-3, and consequently, the brightness seen from a predetermined viewpoint is different for each of the local regions 22-1 to 22-3. Note that the reference orientation within a single local region is almost identical and does not depend on the location of the prism 21; therefore, the orientation of prisms 21 distributed in an individual local region may be the same.

In this example, the rotation angle of the reflection surface 21a of the prism 21 in a local region is determined in accordance with the tone in the corresponding local region as above described. For example, assume that the brightest level is presented to the predetermined viewpoint when the rotation angle is A(°). Here, the rotation angle for each local region is set to shift from A(°) by a predetermined angular offset d each time the tone decreases one level. For instance, consider a local region that is m levels less in tone than the brightest local region (where is an integer and 0≤m≤n−1); the rotation angle of a reflection surface 21a of the prisms 21 in that local region is established as (A±md)

The predetermined angular offset d may be set so that the distance between peaks in the light intensity from each of the two local regions with a tone difference of one level is greater than or equal to one half the gap between an observer's eyes at the predetermined viewpoint. Hereby, the local region that an observer senses as a bright local region changes sequentially as the observer's viewpoint moves roughly parallel to the emission surface 2c of the light guide plate 2 and along the horizontal direction.

For example, according to one or more embodiments of the present invention, when the distance between the light guide plate 2 and the observer's viewpoint is 600 mm and the gap between an observer's eyes is 65 mm, then the angle formed between the designated direction of the two local regions with a one-step difference in tone is greater than or equal to arctan(32.5/600)≈3.1°. Here, according to one or more embodiments of the present invention, if the refractive index of the light guide plate 2 is 1.5, the difference in rotation angles of the prisms into local regions is greater than or equal to 2° so that the angle between the designated directions of the two local regions is greater than or equal to 3.1°. Consequently, according to one or more embodiments of the present invention, in this case the predetermined angular offset d is, for instance, greater than or equal to 2°. In contrast, is the predetermined angular offset d is too large, then this reduces the number of tones possible, and tends to make it difficult to create a metallic feel. Therefore, if the range of rotation angles where light from the light source 3 reaches the predetermined viewpoint is ±35° about the angle A(°), the predetermined angular offset d may be set to 5° or less, whereby the number of tones, i.e., the designated direction can be established at eight or more levels.

As previously mentioned, the rotation angle of a prism may be used to adjust the designated direction for each local region; in this case, according to one or more embodiments of the present invention, the collimator 4 collimates the light from the light source 3 in a plane including the length direction of the incidence surface 2a to increase the differences in brightness between local regions.

Figure 6:
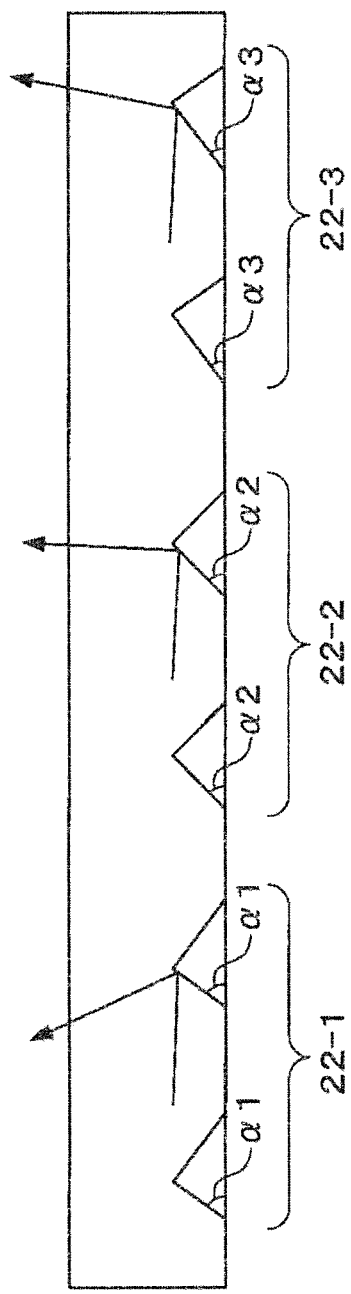
FIG. 6 is a lateral view of the section in the light guide plate corresponding to a portion of a light emitting region depicting an arrangement of prisms when the brightness in a local region is adjusted via the inclination of the reflection surface of the prisms in the local region.

FIG. 6 is a lateral view of the section in the light guide plate 2 corresponding to a portion of a light emitting region 22 depicting an arrangement of prisms 21 when the brightness in a local region is adjusted via the inclination of the reflection surface 21a of the prisms 21 in the local region; FIG. 6 illustrates three local regions 22-1 to 22-3.

In this example, the inclination of the reflection surface 21a of the prisms 21 distributed in the local region 22-1, the local regions 22-2, and the local region 22-3 are α1, α2, and α3, respectively. The inclination α1, α2, and α3 are mutually distinct. Therefore, because the local regions 22-1 to 22-3 each reflect the light from the light source 3 toward different directions, and thus the designated direction is also distinct for each local region. As a result, the brightness seen from a predetermined viewpoint is different for each of the local regions.

In this example, the inclination of the reflection surface 21a of the prism 21 in a local region is determined in accordance with the tone in the corresponding local region as above described. The inclination B of a local region that appears brightest at the predetermined viewpoint is established so that the designated direction thereof is oriented toward the predetermined viewpoint. Here, the inclination for each local region is set to shift from B(°) by a predetermined angular offset d each time the tone decreases by one level. For instance, consider a local region that is m levels less in tone than the brightest local region (where is an integer and 0≤m≤n−1); the inclination of a reflection surface 21a of the prisms 21 in that local region is established as (B±md). According to one or more embodiments of the present invention, the inclination in each local region is established to change within a range of inclination angles where at least a portion of the light from the light source 3 propagating through the light guide plate 2 is totally reflected.

As previously mentioned, the inclination of a prism may be used to adjust the designated direction for each local region; in this case, according to one or more embodiments of the present invention, the collimator 4 collimates the light from the light source 3 in a plane including the incidence surface 2a widthwise to increase the differences in brightness between local regions.

As illustrated in FIG. 5 and FIG. 6, the brightness for each of the local regions may be adjusted by way of the designated direction for each local region, that is, by adjusting the rotation angle or the inclination of the reflection surface of a prism for each local region; in this case, changing the location of the viewpoint changes the angular offset between the direction from each local region toward the viewpoint and the designated direction of the local region. As a result, local regions become brighter and darker in accordance with the change in the location of the viewpoint and the brightness and darkness between local regions may switch in certain cases. In particular, the orientation of the reflection surface of each of the prisms in a local region may be established so that the darker the local region when seen from a predetermined viewpoint the larger the difference between the designated direction of that local region and the direction toward the predetermined viewpoint. Therefore, the darker the local region appears when seen from the predetermined viewpoint, the brighter the local region can appear when the location of the observer's viewpoint moves to a large extent from the predetermined viewpoint. The effect is identical to observing light reflecting from an uneven metallic surface from a specific direction while changing the viewpoint. Therefore, the light guide plate 2 is able to produce a metallic texture for the observer.

As above described, the light emitting region in the display device is presented through the light guide plate and forms a design that produces a metallic texture; the light emitting region is divided into a plurality of local regions and a designated direction is established for each local region in accordance with the tone for the local region whereby the brightness seen from a predetermined viewpoint changes in accordance with the design. For each local region the orientation of the reflection surface of the prisms distributed in the local region is established in accordance with the designated direction set for that local region. Therefore, the display device is capable of producing a metallic texture for the observer, and as a result improves the observer's sense of realism.

In modifying the display device, the difference in light intensity per unit area in the designated directions of two local regions where the brightness differs by one level is in a range smaller than the difference in light intensity reaching the predetermined viewpoint per unit area; the total area of reflection surfaces of the prism per unit area may vary per local region. Hereby, the display device reproduces said metallic texture via the design displayed in the light emitting region while also exhibiting light and shade.

In another modification of the display device the number of Torrance varies locally in the light emitting region 22. The display device is thus able vary textures that can be expressed in each local area. For example, the number of tones in a portion of the light emitting region may be greater than the number of tolerance in other regions. The local regions in the aforementioned portion may be further divided into a plurality of micro regions to provide gradations in brightness between adjacent local regions seen from the predetermined viewpoint; furthermore, the orientation of prisms distributed in a micro region may change gradually for each micro region in accordance with the tonal change.

Figure 7:
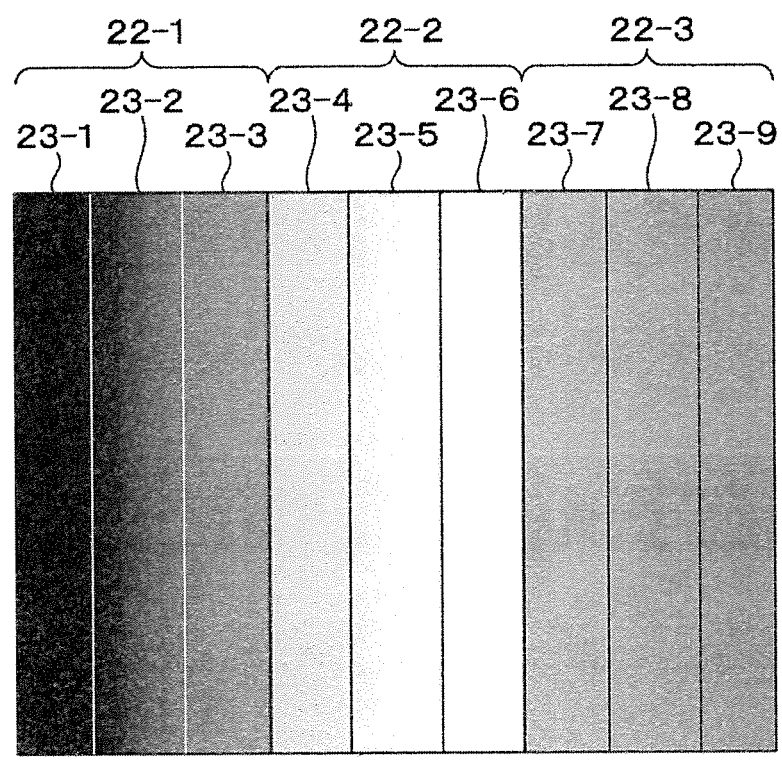
FIG. 7 is a partial exploded plan view of the light emitting region depicting a possible modification.
Figure 7:
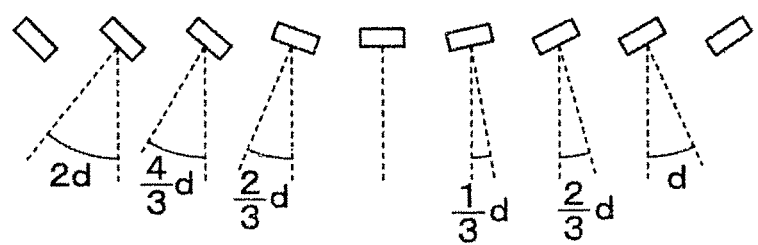

FIG. 7 is a partial exploded plan view of the light emitting region 22 depicting a possible modification. This example depicts three local regions 22-1 to 22-3. When seen from a predetermined viewpoint, the center local region 22-2 is the brightest with the left and right local regions 22-1, 22-3 being darker than the local regions 22-2. Additionally, in this modification example the local region 22-1 is further divided into three micro regions 23-1 to 23-3 in order from the left along the direction the brightness changes (the horizontal direction in the figure) so that the brightness changes gradually between the local regions 22-1 and 22-2, and the local regions 22-2 and 22-3. In the same manner the local regions 22-2 and the local region 22-3 are each divided, into three micro regions 23-4 to 23-6 and 23-7 to 23-9 respectively in order from the left along the direction the brightness changes. The number of micro regions included in a single local region is not limited to three; the number of micro regions may be set in accordance with the number of tones that may be established, i.e., the number of stages of orientation of the prism and the degree of change in brightness between local regions. Similarly, the size of each of the micro regions may be mutually identical or may be mutually distinct.

The difference in tone is two steps when no micro regions are established between the local region 22-1 and the local regions 22-2; for example, consider the angular offset of the rotation angle of prisms in the center of the local region to be 2d. In this case, the rotation angle of the prisms may change by (⅔)d from the micro region 23-1 to the micro region 23-5. Similarly, the difference in tone is one step when no micro regions are established between the local region 22-2 and the local regions 22-3; for example, consider the angular offset of the rotation angle of prisms in the center of the local region to be d. In this case, the rotation angle of the prisms may change by (d/3) from the micro region 23-5 to the micro region 23-9. Note that, the inclination may gradually change per micro region instead of the rotation angle of the prism as above described.

In this manner, the number of tones may be increased locally, and the orientation of the prism varied along the direction the brightness changes by an even smaller angle to thus provide a smoother change in brightness. As a result the display device is capable of reproducing a texture or simulating a smooth metallic surface.

The proportion of the total area of the reflection surfaces for prisms in a unit surface area in a micro region may gradually change in addition to or instead of the change in orientation of the prism whereby the display device changes the brightness as a gradient. For example, the number of prisms in a unit surface area in the micro region, that is, the density of the prisms may gradually increase. In this case, the amount of light reflected increases due to the larger the proportion of the total area of the reflection surfaces on the prisms in the unit surface area; and therefore, the brightness changes along the same direction even when the location of the observer's viewpoint moves to a certain extent.

In another modification example, the light emitting region includes a local region where the brightness changes due to the change in location of the viewpoint and a local region where the brightness remains substantially the same regardless of a change in location of the viewpoint.

Figure 8:
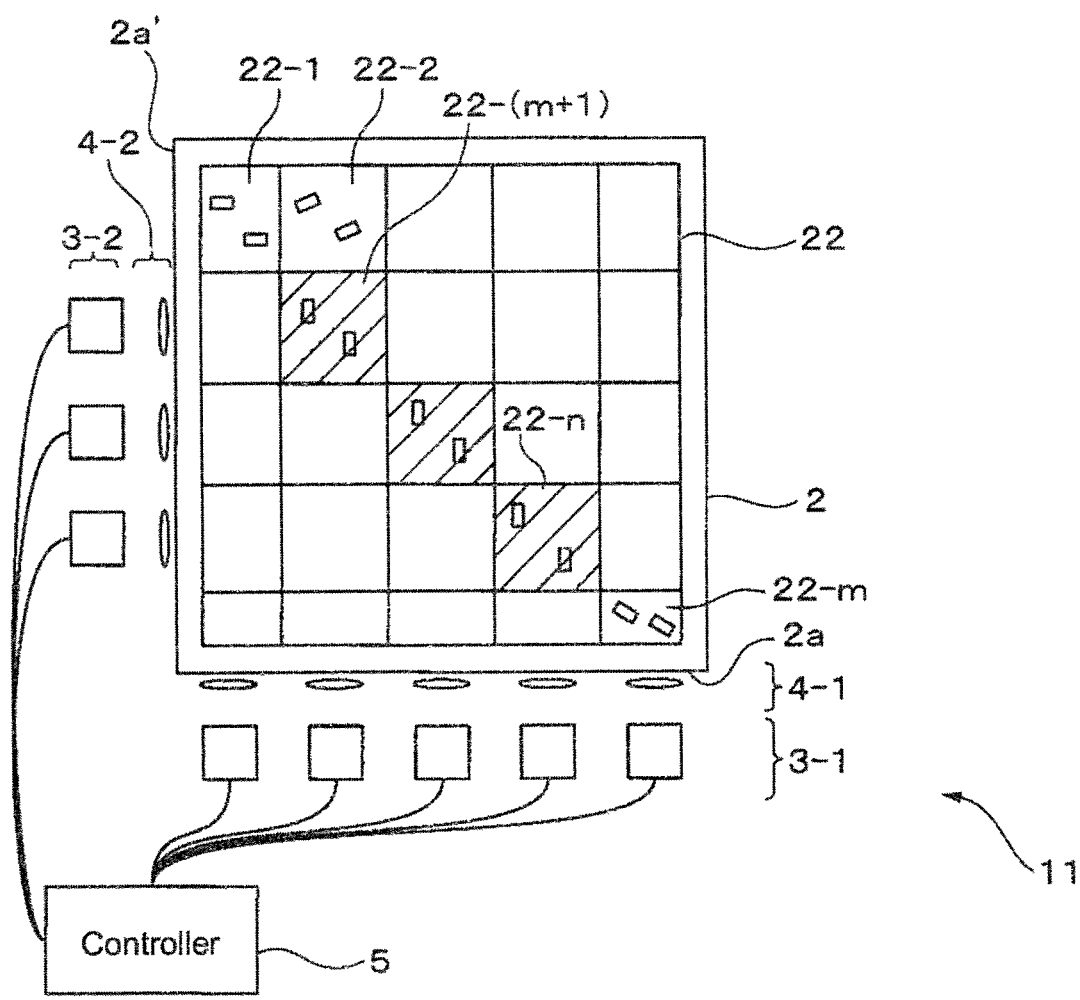
FIG. 8 schematically illustrates a configuration of a possible modification to the display device.

FIG. 8 schematically illustrates a configuration of a possible modification to the display device. In this modification example, two mutually orthogonal side surfaces of the light guide plate 2 are incidence surfaces 2a, 2a'. Additionally, the display device 11 includes two light sources 3-1, 3-2. The light source 3-1 includes a plurality of light emitting elements arranged along the length direction of the incidence surface 2a similar to one or more of the above-described embodiments. Each of the light emitting elements are arranged with the light emitting surface thereof facing the incidence surface 2a with the collimator 4-1 therebetween; the collimator 4-1 is made up of a cylindrical lens having optical power in a plane including the length direction of the incidence surface 2a. Hereby, the collimator 4-1 converts the light from the light emitting elements in the light source 3-1 to parallel light in the plane including the length direction of the incidence surface 2a whereby parallel light enters the light guide plate 2 via the incidence surface 2a.

The light source 3-2 includes a plurality of light emitting elements distributed along the length direction of the incidence surface 2a'. Each of the light emitting elements are arranged with the light emitting surface thereof facing the incidence surface 2a' with the collimator 4-2 therebetween; the collimator 4-2 is made up of a cylindrical lens having optical power in a plane including the length direction of the incidence surface 2a'. Hereby, the collimator 4-2 converts the light from the light emitting elements in the light source 3-2 to parallel light in the plane including the length direction of the incidence surface 2a' whereby parallel light enters the light guide plate 2 via the incidence surface 2a'.

The controller 5 controls the turning on and off of the light source 3-1 and the light source 3-2. The controller 5 may control the turning on and off of the light source 3-1 and the light source 3-2 independently of each other. That is, the controller 5 may turn on the light source 3-1 while the light source 3-2 remains off, and conversely may keep the light source 3-1 off wildlife tours 3-2 is on. Alternatively, the controller may turn on both the light source 3-1 in the light source 3-2.

A plurality of local regions 22-1 to 22-$m$, 22-($m$+1) to 22-$n$ may be established in the light emitting region 22 (where, m and n are integers greater than or equal 2, and m<n). Each of the local regions 22-1 to 22-$m$ may have a tone when seen from the predetermined viewpoint established therefor, similarly to one or more of the above-mentioned embodiments and modification examples. The prisms in each of the local regions 22-1 to 22-$m$ may be arranged to reflect light emitted from the light source 3-1 that enters the light guide plate 2 toward the emission surface while setting the rotation angles therefor in accordance with a given tone to reproduce a metallic texture.

Whereas, the local regions 22-($m$+1) to 22-$n$ may be arranged to reflect light emitted from the light source 3-2 that enters the light guide plate 2 toward the emission surface. For example, each of the prisms in the local regions 22-($m$+1) to 22-$n$ may be arranged so that the designated direction thereof is roughly parallel to the normal line direction of the emission surface of the light guide plate 2. The local regions 22-($m$+1) to 22-$n$ may also each include a plurality of prisms where the reflection surfaces are at different inclinations.

In this case, light from the light source 3-1 is parallel in a plane including the length direction of the incidence surface 2$a$ and the rotation angle of the prisms in each of the local regions 22-1 to 22-$m$ may vary per local region; therefore, the brightness in the local regions 22-1 to 22-$m$ changes in accordance with the movement of a viewpoint when the observer's viewpoint moves along the length direction of the incidence surface 2$a$.

On the other hand, light from the light source 3-2 is not parallel in a plane including the length direction of the incidence surface 2$a$, i.e., is not parallel in a plane including the width direction of the incidence surface 2$a$'; and thus the light from the light source 3-2 spreads in accordance with the radiation pattern from each of the light emitting elements in the light source 3-2 and the thickness of the light guide plate 2. Therefore, the brightness of the local regions 22-($m$+1) to 22-$n$ hardly changes even when the observer's viewpoint moves along the length direction of the incidence surface 2$a$ of the light guide plate 2.

Thus according to this modification example, the light emitting region in the display device may be a combination of areas providing a metallic texture and other areas. Therefore, the display device may present various designs containing sections that reproduce a metallic texture to thereby improve an observer's sense of realism.

The local regions 22-1 to 22-$m$ and the local regions 22-($m$+1) to 22-$n$ may overlap with each other. In this case, the prisms corresponding to a local region may be staggered for each local region. The prisms belonging to one local region may alternate with the prisms belonging to another local region where local regions overlap.

In yet another modification example, the light source 3 (or, the light source 3-1) may include groups of light emitting elements that emit different colors in accordance with the desired metal to be reproduced. The groups of the plurality of light emitting elements may be arranged along the length direction of the incidence surface 2$a$ of the light guide plate 2. The light emitting region 22 may include individual groups of light emitting elements where one group emits white light and another group emits yellow light when desiring, for instance, to reproduce a metallic gold texture. The light emitting region 22 may include individual groups of light emitting elements where one group emits green light and another group emits white light when desiring, for instance, to reproduce a metallic bronze texture. Moreover, the light emitting region 22 may include individual groups of light emitting elements that emit white light when desiring, for instance, to reproduce a metallic silver texture.

The metal color reproduced may change in accordance with the position in the light emitting region 22; in this case the groups of light emitting elements radiating light toward a certain position may be configured for each position to output light corresponding to the metal color for that position.

Additionally, the angle of light reflected by the prisms 21 and emitted from the emission surface 2$c$ relative to the normal line direction of the emission surface 2$c$ increases as the rotation angle of the prisms 21 increases from a direction directly facing the light source 3 when the inclinations of the prisms 21 are uniform. Another modification involves increasing the inclination of the prisms 21 as the rotation angle of the prisms 21 increase from a direction directly facing the light source 3. For instance, assume the rotation angle of a prism 21 from the direction directly facing the light source 3 is $\theta(°)$; given the inclination of the prism is $\alpha(°)$, the inclination $\alpha$ satisfies the following expression.

$$\alpha > 0.028\theta^2 - 0.17\theta + 42$$

The inclination of the prism may be established in this manner so that light from a local region reaches a viewpoint when the viewpoint is in front of the light emitting region 22, even if the prisms in that local region have a large rotation angle. It is therefore possible to prevent a portion of the light emitting region 22 from being invisible because that portion is dark when the observer views the light emitting region 22 from in front.

Another modification is to exclude the collimator 4. Without the collimator, light entering the light guide plate 2 from the light source 3 spreads in accordance with the radiation pattern of the light emitting elements in the light source 3 and the thickness of the light guide plate 2. Therefore, more light travels outside the designated direction of the local regions compared to when the collimator 4 is used. This results in a smaller difference in brightness between local regions compared to when the collimator 4 is used.

In another modification, the light source 3 includes a plurality of light emitting elements and the controller varies which light emitting element is turned on over time. At this point the controller 5 may also vary the number of light emitting elements that turn on simultaneously over time. Thus, the positional relationship changes between the light emitting element that is turned on and the prisms in the light emitting region 22; therefore, the display device 1 may change the amount of light in the local regions of the light emitting region 22 over time even when an observer views the light emitting region 22 from the same position. Therefore, the display device 1 may further improve the metallic texture produced for the observer. In particular, the rotation angle of the prisms may be used to adjust the light intensity in each of the local regions in the light emitting region 22; in this case, the local regions that appear bright and the local regions that appear dark may switch depending on the change in position of the light emitting element that is active. Therefore, the display device 1 may further improve the metallic texture produced for the observer.

The controller 5 may determine a procedure for turning on the light emitting elements according to activation sequence information that specifies an order of activation. This activation sequence information may be included in a control signal received from a host control device, or may be stored beforehand in the memory of the controller 5.

According to this modification example, the display device is able to convert the region producing a metallic texture into an animation, and as a result improve the observer's sense of realism.

A display device according to any of the above embodiments or modification examples may be mounted in game machines such as a pinball machine or a slot machine.

Figure 9:
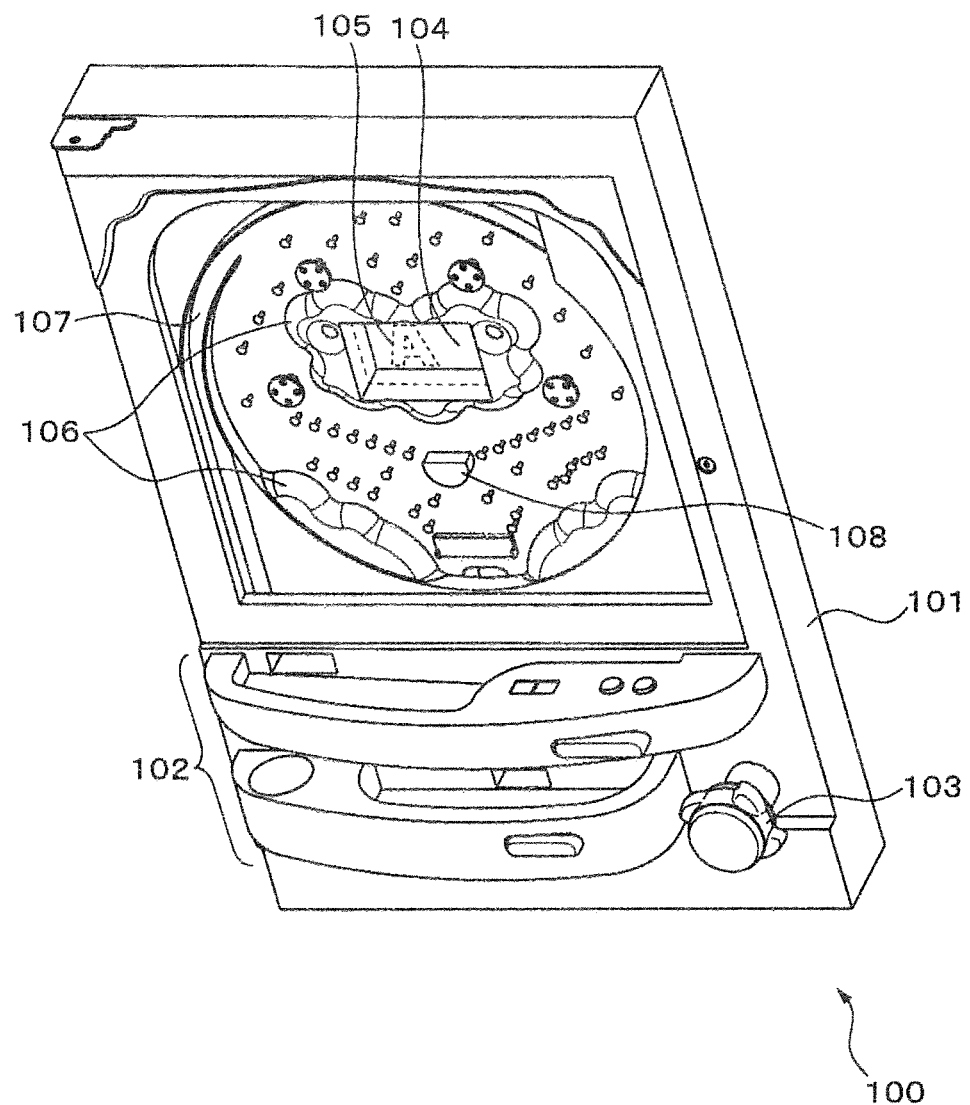
FIG. 9 is a schematic perspective view, i.e., a user view, of a pinball game machine including a display device according to one or more embodiments of the present invention, or modification examples.

FIG. 9 is a schematic perspective view, i.e., a user view, of a pinball game machine including a display device according to one or more embodiments of present invention, or modification examples. As illustrated in FIG. 9, a pinball machine 100 includes a playfield 101, which is the main game unit. The playfield 101 is where play takes place and takes up a majority of the machine, from the top portion to the center. The pinball machine 100 also includes a ball trough 102 arranged below the playfield 101, an operation portion 103 provided with a jog; a liquid crystal display provided at roughly the center of the playfield 101; and a display device 105 disposed on the front surface of the liquid crystal display 104.

To aid in presentation of the game, the pinball machine 100 includes accessories 106 arranged on the front surface of the play field 101, at the lower part thereof and surrounding the display device 105. The playfield 101 includes rails 107 positioned at the sides. The playfield 101 may also include multiple obstacle pins (not shown) and at least one prize target 108.

The input unit 103 launches the pinball at a predetermined force via a launcher (not shown) in accordance with the amount of rotation of the jog by a player. A launched pinball travels upward along the rails 107 and falls between the multiple obstacle pins. When a sensor (not shown) detects that a pinball has entered any of the prize targets 108, a main controller (not shown) provided on the rear side of the playfield 101 pays out a predetermined number of pinballs depending on the prize into the ball trough 102 via a payout device (not shown). The main controller also drives the liquid crystal display 105 and the display device 101 via a CPU (not shown) provided on the rear side of the playfield 104.

The display device 105 is merely one example of a display device according to the one or more of above embodiments and modification examples; this display device 105 may be attached to the playfield 101 so that the output surface of the light guide plate is oriented toward the player. The controller in the display device 105 may illuminate the light source in accordance with a control signal from the game CPU in response to the state of play. As a result the player may be presented with a video on the liquid crystal display 104 while viewing a design that provides a metallic feel. Alternatively, the controller may turn off the light source so that the observer may view only the video presented on the liquid crystal display 104 via the light guide plate.

A person having ordinary skill in the art may make various modifications in the above manner within the scope of the invention in accordance with how the device will be used.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A light guide plate formed from a panel transparent to visible light, comprising:
    a first incidence surface provided to form a sidewall of the light guide plate that faces a light source configured to emit visible light; and
    a plurality of prisms provided in a predetermined region on one surface of the light guide plate,
    wherein the prisms comprise a plurality of reflection surfaces that reflects the visible light emitted from the light source and entering the light guide plate from the first incidence surface toward another surface of the light guide plate,
    wherein the predetermined region is divided into a plurality of local regions corresponding to a plurality of tones in the predetermined region when seen from a predetermined viewpoint, and in each local region, an orientation of the reflection surface of the prisms distributed in the local region is established in accordance with the tone corresponding to that local region,
    wherein light from the light source collimates in a plane including a length direction of the first incidence surface and enters the light guide plate,
    wherein, for each local region, the prisms and the reflection surfaces distributed in a local region are configured such that the prisms and an angle of the reflection surface along the one surface relative to a reference orientation are oriented in accordance with the tone corresponding to the local region, where the reference orientation is taken as an orientation directly facing the light source,
    wherein the prisms include a first reflection surface and a second reflection surface rotated in mutually reverse orientations along the one surface, and
    wherein, for each local region, the prisms and the first and second reflection surfaces distributed in a local region are configured such that the prisms and the angle of the first and second reflection surfaces respectively along the one surface relative to the reference orientation are oriented in accordance with the tone corresponding to the local region,
    wherein the first reflection surface and the second reflection surface are bent at a center lengthwise of the plurality of reflection surfaces and protrude in relation to the light source.

2. The light guide plate according to claim 1,
    wherein light from the light source collimates in a plane including the width direction of the first incidence surface and enters the light guide plate, and
    wherein, for each of the local regions, the prisms distributed in a local region are configured such that the inclination of the reflection surface of the prisms relative to the one surface are oriented in accordance with the tone corresponding to said local region.

3. The light guide plate according to claim 2, wherein the number of tones in a portion of the predetermined region is configured to be greater than the number of tones in other regions in the predetermined region.

4. The light guide plate according to claim 2, wherein each local region in the plurality of local regions is established so that two mutually adjacent local regions in at least one portion of the predetermined region differ by one level.

5. The light guide plate according to claim 1, wherein the number of tones in a portion of the predetermined region is configured to be greater than the number of tones in other regions in the predetermined region.

6. The light guide plate according to claim 1, wherein each local region in the plurality of local regions is established so that two mutually adjacent local regions in at least one portion of the predetermined region differ by one level.

7. The light guide plate according to claim 1,
wherein light from the light source collimates in a plane including the length direction of the first incidence surface and enters the light guide plate, and
wherein, for each local region, the prisms and the reflection surfaces distributed in a local region are configured such that the prisms and the angle of the reflection surface along the one surface relative to a reference orientation are oriented in accordance with the tone corresponding to the local region, where the reference orientation is taken as an orientation directly facing the light source,
wherein the light guide includes a second incidence surface formed is another surface orthogonal to the side surface that forms the first incidence surface; and
wherein the predetermined region further includes a second local region the second local region further including a plurality of second prisms including a reflection surface that reflects the visible light emitted from a second light source and entering the light guide plate from the second incidence surface toward another surface of the light guide plate.

8. The light guide plate according to claim 1, wherein the number of tones in a portion of the predetermined region is configured to be greater than the number of tones in other regions in the predetermined region.

9. The light guide plate according to claim 1, wherein the number of tones in a portion of the predetermined region is configured to be greater than the number of tones in other regions in the predetermined region.

10. The light guide plate according to claim 1, wherein each local region in the plurality of local regions is established so that two mutually adjacent local regions in at least one portion of the predetermined region differ by one level.

11. The light guide plate according to claim 1, wherein each local region in the plurality of local regions is established so that two mutually adjacent local regions in at least one portion of the predetermined region differ by one level.

12. A display device comprising:
a light source configured to emit visible light;
a light guide plate formed from a panel transparent to visible light; and
a controller configured to control turning on and off of the light source,
wherein the light guide plate comprises:
a first incidence surface provided to form it a sidewall of the light guide plate that faces the light source, and
a plurality of prisms provided in a predetermined region on one surface of the light guide plate, the prisms including a plurality of reflection surfaces that reflects the visible light emitted from the light source and entering the light guide plate from the incidence surface toward another surface of the light guide plate, and
wherein the predetermined region is divided into a plurality of local regions corresponding to a plurality of tones in the predetermined region when seen from a predetermined viewpoint, and in each local region, an orientation of the reflection surface of the prisms distributed in the local region is established in accordance with the tone corresponding to that local region,
wherein light from the light source collimates in a plane including a length direction of the first incidence surface and enters the light guide plate,
wherein, for each local region, the prisms and the reflection surfaces distributed in a local region are configured such that the prisms and an angle of the reflection surface along the one surface relative to a reference orientation are oriented in accordance with the tone corresponding to the local region, where the reference orientation is taken as an orientation directly facing the light source,
wherein the prisms include a first reflection surface and a second reflection surface rotated in mutually reverse orientations along the one surface, and
wherein, for each local region, the prisms and the first and second reflection surfaces distributed in a local region are configured such that the prisms and the angle of the first and second reflection surfaces respectively along the one surface relative to the reference orientation are oriented in accordance with the tone corresponding to the local region,
the first reflection surface and the second reflection surface are bent at a center lengthwise of the plurality of reflection surfaces and protrude in relation to the light source.

13. The display device according to claim 12,
wherein the light source includes a plurality of light emitting elements arranged along the length direction of the incidence surface, and
wherein the controller varies the light emitting elements among the plurality of light emitting elements that turn on over time.

14. A game machine comprising:
a main game unit; and
a display device provided on the surface of the main game unit facing a player,
wherein the display device comprises:
a light source configured to emit visible light,
a light guide plate formed from a panel transparent to visible light, and
a controller configured to control the turning on and off of the light source,
wherein the light guide plate comprises:
a first incidence surface provided to form a sidewall of the light guide plate that faces the light source, and
a plurality of prisms provided in a predetermined region on one surface of the light guide plate, the prisms including a plurality of reflection surfaces that reflects the visible light emitted from the light source and entering the light guide plate from the incidence surface toward another surface of the light guide plate, and
wherein the predetermined region is divided into a plurality of local regions corresponding to a plurality of tones in the predetermined region when seen from a predetermined viewpoint, and in each local region, an orientation of the reflection surfaces of the prisms distributed in the local region is established in accordance with the tone corresponding to that local region,
wherein light from the light source collimates in a plane including a length direction of the first incidence surface and enters the light guide plate,
wherein, for each local region, the prisms and the reflection surfaces distributed in a local region are configured such that the prisms and an angle of the reflection surface along the one surface relative to a reference orientation are oriented in accordance with the tone corresponding to the local region, where the reference orientation is taken as an orientation directly facing the light source, wherein the prisms include a first reflection surface and a second reflection surface rotated in mutually reverse orientations along the one surface, and wherein, for each local region, the prisms and the first and second reflection surfaces distributed in a local region are configured such that the prisms and the angle of the first and second reflection surfaces respectively along the one surface relative to the reference orientation are oriented in accordance with the tone corresponding to the local region, the first reflection surface and the second reflection surface are bent at a center lengthwise of the plurality of reflection surfaces and protrude in relation to the light source.

* * * * *